United States Patent [19]

Holder

[11] 4,220,453
[45] Sep. 2, 1980

[54] PROCESS FOR PRODUCING ARTIFICIAL FIRE LOGS

[76] Inventor: Morris E. Holder, P.O. Box 9283, Chattanooga, Tenn. 37412

[21] Appl. No.: 47,093

[22] Filed: Jun. 11, 1979

[51] Int. Cl.² ............................................. C10L 5/00
[52] U.S. Cl. .................................... 44/10 B; 44/1 E; 44/10 R
[58] Field of Search .................... 44/1 E, 10 R, 10 B, 44/13, 2

[56] References Cited

U.S. PATENT DOCUMENTS

| | | |
|---|---|---|
| 3,192,561 | 7/1965 | Archer et al. ...................... 425/324.1 |
| 3,843,336 | 10/1974 | Messman ............................. 44/10 R |
| 3,973,922 | 8/1976 | Williams ............................. 44/10 B |
| 3,986,845 | 10/1976 | Hotchkiss ............................ 44/13 |

*Primary Examiner*—Carl F. Dees
*Attorney, Agent, or Firm*—Jones, Thomas & Askew

[57] ABSTRACT

Process for producing artificial fire logs from a mixture comprising wood material and a binder, particularly a resin binder. Each log is formed in an individual mold, and a batch of mix required for a single log is divided into two approximately equal portions for loading into the mold. The mixture within the mold is compressed, and the mold is then closed. The closed mold is heated, and curing of the resin takes place within the capped mold. The finished log is then removed from the mold, which is reusable.

11 Claims, 1 Drawing Figure

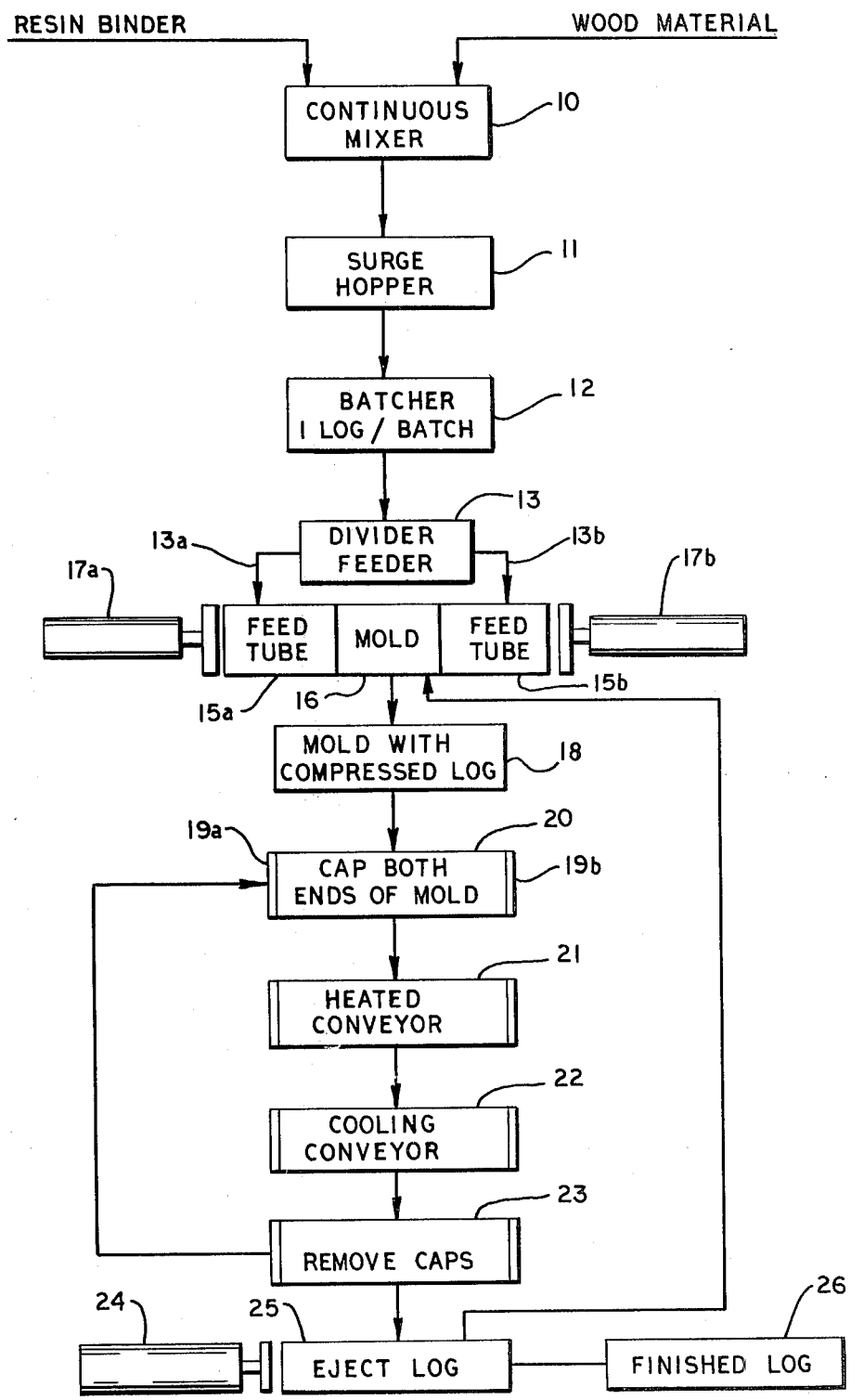

PROCESS FOR PRODUCING ARTIFICIAL FIRE LOGS

BACKGROUND OF INVENTION

This invention relates in general to artificial fire logs, and in particular to a process for producing artificial fire logs.

Artificial fire logs are generally known in the art, and such logs in the past have typically consisted of finely divided wood particles such as sawdust carried in a solidified binder such as wax and a petroleum-derivative filler material. A typical prior art process for making such fire logs includes the steps of mixing together sawdust and melted wax, and then passing the fluid sawdust-wax mixture through a screw extruder to form the mixture in an elongate shape generally resembling a natural fire log. The extruded product is cut at desired lengths to provide individual fire logs, which are allowed to solidify and are then suitably packaged for shipment. One example of the foregoing process may be found in U.S. Pat. No. 4,042,343.

Notwithstanding the past popularity of artificial fire logs made with a binder of wax or a similar petroleum product, it has become increasingly apparent that such artificial fire logs have undesirable features. The relatively great proportion of the wax binder in the typical fire log of the prior art, coupled with the burning temperature and other characteristics of that binder results in a fire log which may burn at a dangerously hot temperature. The high burning temperature of wax-binder artificial fire logs can produce hazardous conditions, particularly where the logs are burned in a sheet-metal fireplace installed near combustible building structure, or where more than one such firelog is burned at the same time in violation of the manufacturer's instructions. Moreover, it has been found that wax-binder fire logs actually produce a danger of explosion when burned in an airtight wood stove, because such logs when heated give off hydrocarbon vapors which accumulate to an explosive concentration within the enclosed stove.

In an effort to overcome the problems associated with wax-binder artificial fire logs, it has been proposed to make artificial fire logs without a wax binder material. For example, it has been learned that a resin solution such as urea formaldehyde makes a satisfactory binder for artificial fire logs, and burns at a lower and more controlled temperature than the wax binder previously associated with artificial fire logs. The use of such a resin solution also avoids the aforementioned explosion problem. It has also been found that artificial fire logs made with a resin binder can utilize a greater range and proportion of wood products, relative to the weight of the binder material, than is the case with the conventional fire log made with a wax binder material. Thus, artificial fire logs made with a resin binder provide a more effective use of natural wood products such as sawdust, shavings and chips, while providing an artificial fire log which burns longer and safer than comparably-sized logs using a wax binder. It has also been proposed in the art to overcome the problems associated with wax-binder fire logs by making artificial fire logs without any binder. Such binderless fire logs are produced by compressing together wood products such as sawdust under relatively high pressure, e.g., 8,000–9,000 psi, to compact the wood product and also to overcome sliding friction in the absence of wax binders. Such binderless fire logs have the disadvantages of being extremely hard to ignite and, once ignited, of tending to fall apart and smothering the fire.

Although artificial fire logs having a resin binder are preferable to those having a wax binder, practical difficulties arise if the production techniques formerly associated with wax-binder fire logs are sought to be used to make resin-binder fire logs. For example, the extrusion process for producing artificial fire logs is practical only with fire logs employing a wax binder, because the presence of wax in the extruded mixture lubricates the extruder wall and other friction-causing elements, such as the flight surface of the screw conveyor used in the typical extrusion process, thereby greatly reducing sliding friction in the extrusion process. The lubricating effect of the wax binder is, of course, absent in artificial fire logs having a resin binder, and working pressures in the order of 8,000–9,000 psi would be required to extrude artificial fire logs having a resin binder. Hydraulic systems capable of operating in the foregoing pressure range are relatively expensive, and consume a considerable amount of energy in operation. Such high-pressure hydraulic systems are potentially dangerous in a manufacturing facility, moreover, since even a pinhole leak in a hydraulic line at the foregoing pressures can be extremely hazardous to operating personnel.

In addition to the foregoing disadvantages of the extrusion process in producing artificial fire logs, it becomes difficult to extrude fire logs from wood product mixtures including wood shavings, chips, or other discrete elements, unlike the relatively homogenous sawdust particles used in wax-binder fire logs of the prior art.

BRIEF SUMMARY OF INVENTION

Stated in general terms, the process for producing artificial fire logs according to the present invention utilizes an individual mold for each fire log produced. A mixture of wood products and binder material is prepared, and a quantity of mixture sufficient to fill a mold is divided into two portions. Each portion is separately placed in the mold, and the mixture is compressed within the mold. The mold is then closed to define a fixed volume within the mold, and the mold is heated to effect at least partial curing of the binder material. Pressure applied to the mixture before closing the mold, as well as pressure generated in the closed mold during the heating and curing, is retained within the closed mold and is thus applied to the mixture therein, facilitating the production of the fire log. After curing is at least partially completed, the mold is opened and the finished fire log is ejected. Stated somewhat more specifically, the mold comprises a cylinder open at each end and the portions of mix are separately introduced into the ends of the mold. Both ends of the mold are closed after the mixture is compressed in the mold.

Accordingly, it is an object of the present invention to provide an improved process for producing artificial fire logs.

It is another object of the present invention to provide an artificial fire log production process which is especially adapted to artificial fire logs including discrete wood products such as chips, shavings or the like.

It is still another object of the present invention to provide an artificial fire log production process which is particularly useful in making fire logs that do not include a wax binder material.

Other objects and advantages of the present invention will become more readily apparent from the following description of a preferred embodiment.

BRIEF DESCRIPTION OF DRAWING

The FIGURE is a flow chart schematically setting forth the several steps of the disclosed process according to the present invention.

DETAILED DESCRIPTION OF DISCLOSED EMBODIMENT

Turning to the FIGURE, the process of the disclosed embodiment starts with the initial step 10 of mixing a quantity of wood material and a resin binder. The nature of the wood material is not critical to the present invention, although a specific embodiment of the present invention uses mainly air dried hardwood shavings. All sizes and shapes of shavings and chips, intermixed with a variable quantity of sawdust, are used, and it will be understood that the wood material is typically obtained in the form of scrap from various woodworking operations.

The choice and formulation of the particular resin binder is also not critical to the process of the present invention, although in the aforementioned specific embodiment a urea formaldehyde resin in a water solution is effectively used. The formulation and characteristics of such resins are well known to those skilled in the art, and need not be repeated herein. It should also be understood, moreover, that the present process, while intended to produce artificial fire logs having a binder material of resin, is not so limited and can also be used to produce other products such as conventional wax-binder artificial fire logs.

The mixing step 10 preferably takes place with a continuous mixer, to which appropriate quantities of wood material and resin binder are added. The mixture of wood material and binder from the mixing step 10 is preferably supplied to a surge hopper 11, to receive and temporarily store the mixture. The step of batching 12, or preparing a batch of mixture sufficient to produce one fire log, follows the surge hopper 11. The volume of a batch obviously depends on the size of the fire log, which is in turn determined by mold size, and the weight of a batch is a function of the type of wood material and its moisture content.

Each batch of material is then divided at step 13 into two portions which are preferably substantially equal in volume, and the batch portions are fed as shown at 13a and 13b to the separate feed tubes 15a and 15b for introduction into the open ends of a mold. A suitable material conveying apparatus may be employed at 13a and 13b to transfer the batch portions to the respective feed tubes.

The feed tubes 15a and 15b, as schematically indicated in the FIGURE, are aligned with the two ends of a mold 16, which in actual production according to the present invention is one of a number of such molds that is removably positionable between the two feed tubes. Each mold 16 of the present embodiment is a hollow cylindrical tube open at both ends and preferably having a smooth internal surface to reduce friction. The internal dimensions of the mold 16 determine the size of the finished artificial fire log, as previously mentioned, which by way of example may be four inches in diameter by eighteen inches long. The molds 16 must be made of a material having sufficient strength to withstand internal pressure applied from the compression step and from the internal curing step of the present invention, as described below. Molds 16 made of aluminum tubing having a wall thickness of 0.25 inches are effectively used in an actual embodiment of the present invention, and provide the necessary structural strength while being light enough for handling in production.

After the two batch portions are disposed in the respective feed tubes 15a and 15b and a mold 16 is positioned between the feed tubes, the batch portions are loaded into the mold by the pair of feeders 13a and 13b, which by way of example can be screw feeders. By splitting each batch of mix into two approximately equal portions and then loading those portions into the mold from both ends, the length of mold 16 along which each portion passes is cut in half with the results that the time to load the mold is reduced and the amount of sliding friction encountered by the batch portions while moving inwardly along the sidewall of the mold 16 is half the amount to be encountered if the entire batch were loaded into the mold from one end only.

Once the portions of mix are fully loaded into the mold 16, the mix portions are compressed simultaneously and equally from both ends of the mold by means of pressure applied by the hydraulic rams 17a and 17b. The pressure required varies with the species and moisture content of the wood, with a typical operating pressure being in the neighborhood of 2,000 psi. By compressing the mixture from both ends of the mold 16, a more uniform density of mix within the mold is achieved than would be possible by compression only from one end. Furthermore, it has been found that loading the two separate portions of mix into both ends of the mold, followed by compression from both ends of the mold, creates a fracture line in the center of the resulting log, which greatly facilitates breaking the log in half when it is desired to burn only half a log.

Following the step of loading the mold 16 and compressing the binder-wood material mix within the mold, the hydraulic rams 17a and 17b are withdrawn and the mold with a compressed uncured fire log within, indicated at 18 on the FIGURE, is immediately closed by the caps 19a and 19b as schematically illustrated at station 20 of the FIGURE. The caps 19a and 19b, which must be attached and secured before the uncured compressed log rebounds out of the mold 16, must be sufficiently secure to withstand all internal pressure generated within the mold by expansion of the compressed mix and during the subsequent heating and curing. Caps made of any suitable material such as steel plate, and equipped with appropriate fastening devices which engage the ends of the mold 16, are appropriate for the purpose. By closing the mold 16 to define a fixed mold volume, the mixture of wood material and resin binder within the mold is effectively held under compression while curing take place.

The capped mold 16 is next heated to an elevated temperature corresponding to the catalyzing temperature of the particular resin binder used in the mixture. This step of heating the mold 16 is obtained in a production process by placing the mold on a heated conveyor schematically indicated at 21 on the FIGURE, and it will be understood that a number of capped molds 16 may be accommodated on a production conveyor passing through an appropriate heating oven. The time in the oven is varied to allow for variations in species and moisture content of the wood material used. After leaving the oven or other heating stage, the capped molds are transferred to a cooling conveyor indicated at 22, where the molds remain capped until the resin binder has undergone a major portion of curing. Those skilled in the art will recognize that this curing time is also a function of wood species and its moisture content, and some degree of experimentation will be required to determine the proper curing time for a particular combination of resin and wood material; if the mixture within the mold is insufficiently cured, the log will fall apart when removed from the mold.

After the mold 16 and its contents have been cooled for a sufficient time, the end caps 19a and 19b are removed from the mold as indicated at 23, and the finished log can now be ejected from the mold. The now-empty mold 16 and the removed end caps may now be reused to produce additional fire logs. Due to surface friction between the cured log and the mold, a substantial amount of force is typically required to eject the finished log, and hydraulic ram 24 is provided at a work station 25 for that purpose. In order to minimize the amount of ejecting force, and also to facilitate loading the batch portions ito the mold 16 as previously described, it is desirable to coat the inside of the mold with a suitable friction reducing material. Such friction reducing material must be sufficiently durable to withstand the temperatures and pressures used in the process, and suitable materials are known to those skilled in the art.

The finished log 26 removed from the mold 16 is ready to be appropriately packaged and shipped to the customer. The log 26 contains no wax or other petroleum products which burn at an undesirably high temperature or yield potentially explosive vapor when the log is burned in an airtight stove, and the fuel value produced by burning the log comes almost entirely from the wood material forming a major portion of the mixture making up the log. Moreover, the wood material used in making logs according to the present process can be used at it comes in the form of wood scraps from the supplier, including chips, shavings, and sawdust intermixed in variable proportions, and need not be sorted or graded to size as is required for producing fire logs according to the prior art.

It should be understood that the foregoing refers only to a preferred embodiment of the present invention, and that numerous changes and modifications may be made therein without departing from the spirit or the scope of the invention as defined in the following claims.

I claim:

1. A process for making artificial fire logs, comprising the steps of:
    providing a mixture of wood material and a binder in quantity sufficient to fill a tubular mold open at both ends;
    dividing said quantity of mixture into two portions;
    introducing said portions of mixture into the mold at each of the open ends thereof;
    applying pressure to the mixture in the mold from both of the open ends so as to compress the mixture within the mold;
    closing both ends of the mold to maintain the mixture introduced therein at a fixed volume, so that the compressed mixture cannot expand out of the mold due to internally generated pressure;
    maintaining the mold ends closed while effecting at least partial curing of the mixture within the mold;
    removing the closures from the ends of the molds; and
    removing the finished fire log from the mold.

2. The process as in claim 1, wherein the mixture is divided into two portions of approximately equal volume, and each of said portions is separately introduced into the respective open ends of the mold.

3. The process as in claim 1, wherein said pressure is applied simultaneously and substantially equally from both open ends of the mold, so as to provide a more uniform density of the compressed mixture within the mold.

4. The process as in claim 1, wherein said pressure applied to the mixture is released before the ends of the mold are closed, and the ends of the mold are then closed before the compressed mixture rebounds out of the mold.

5. The process as in claim 1, wherein said binder is a catalysible resin binder, and the closed mold is maintained at an elevated temperature at least sufficient to catalyze said resin binder for a period of time to achieve at least partial curing of the mixture within the mold.

6. In a process for producing artificial fire logs wherein a quantity of intermixed cellulosic combustible material and a binder material are molded into a shape which simulates the size and appearance of a fire log, the improvement comprising the steps of:
    providing a tubular hollow mold open at each end;
    dividing the quantity of mixture into two portions of approximately equal volume; and
    loading the mixture into the mold by introducing each portion into a separate open end of the mold.

7. The process as in claim 6, further comprising the step of compressing the mixture within the mold by applying pressure to the mixture substantially uniformly from each end of the mold.

8. In a process for producing artificial fire logs wherein a quantity of intermixed cellulosic combustible material and a curable binder material are molded into a fixed shape by introducing the mixture into a tubular mold, the improvement comprising the step of:
    closing the mold to define a fixed volume substantially occupied by the quantity of mixture; and
    maintaining said closed mold at an elevated temperature for a period of time to achieve at least partial curing of the mixture, while the mixture is held under compression from internal pressure generated from the heat curing.

9. The artificial fire log product made by the process comprising the steps of:
    providing a tubular hollow mold open at each end;
    providing a quantity of intermixed cellulosic combustible material and a binder material;
    dividing said quantity of intermixed material into two portions of approximately equal volume; and
    loading the intermixed material into the mold by introducing each portion into a separate open end of the mold.

10. The product as made by the process of claim 9, further comprising the step of compressing the mixture within the mold by applying pressure to the mixture substantially uniformly from each end of the mold.

11. The product as made by the process of claim 10, further comprising the step of closing the ends of the mold after said pressure is released and before the compressed mixture within the mold can rebound out of the mold.

* * * * *